Oct. 30, 1956  W. R. GREEN  2,768,439
MULTI-BLADE HEDGE TRIMMER
Filed Nov. 24, 1953  2 Sheets-Sheet 1
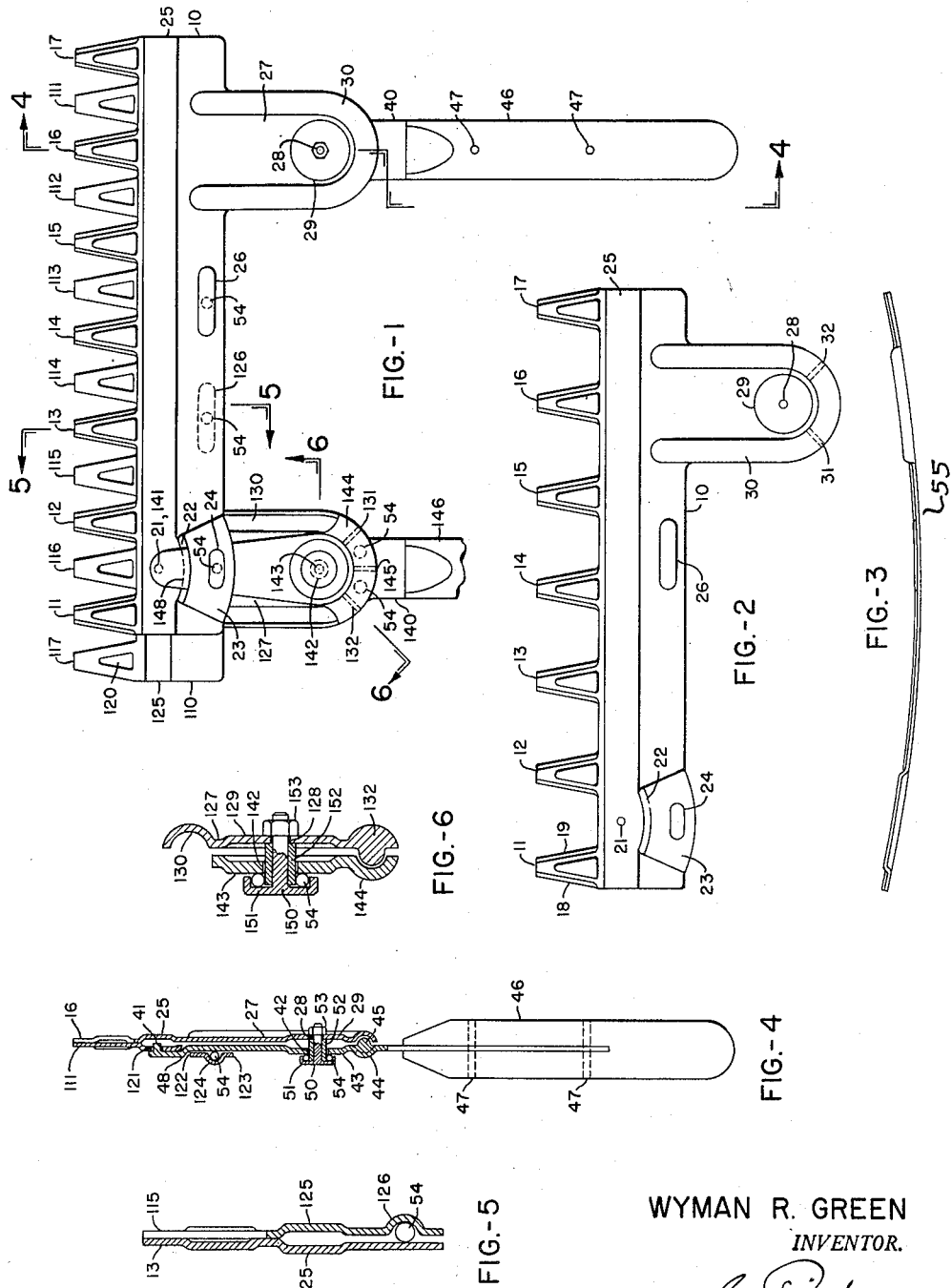
WYMAN R. GREEN
INVENTOR.
BY
ATTORNEY Oct. 30, 1956  W. R. GREEN  2,768,439
MULTI-BLADE HEDGE TRIMMER
Filed Nov. 24, 1953  2 Sheets-Sheet 2
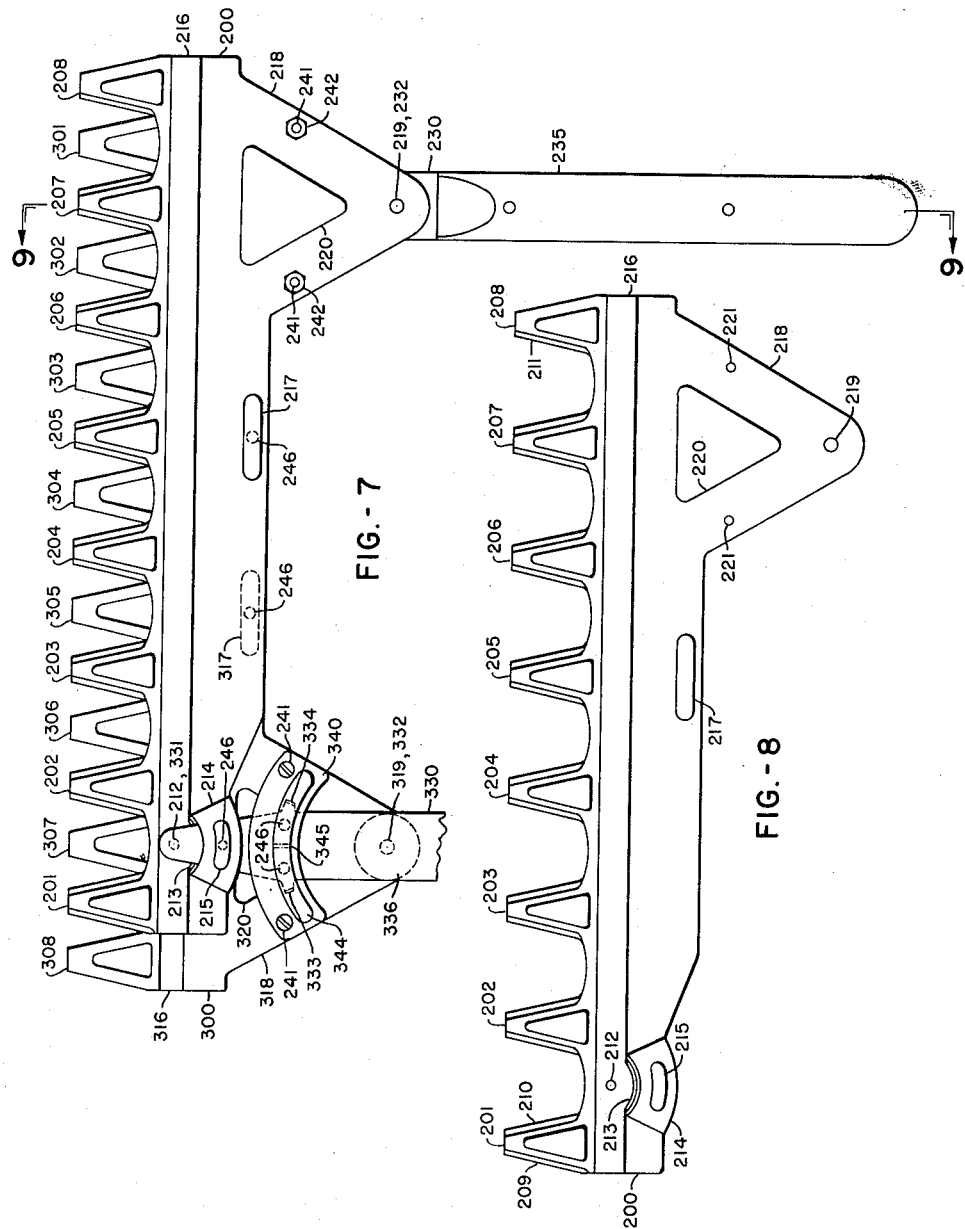
WYMAN R. GREEN
*INVENTOR.*
BY
*ATTORNEY*

United States Patent Office 2,768,439
Patented Oct. 30, 1956

2,768,439

MULTI-BLADE HEDGE TRIMMER

Wyman R. Green, Madison, N. J.

Application November 24, 1953, Serial No. 394,044

2 Claims. (Cl. 30—211)

This invention relates to hedge trimmers of the multi-blade type as more fully set forth hereinafter and as claimed.

One of the objects of my invention is to provide a hedge trimmer that is light in weight, simple in construction, effective in operation, and that can be produced inexpensively;

Another object is to provide a hedge trimmer which employs two cutter bars of like shape;

A further object is to provide a hedge trimmer in which the manual force applied in its operation is multiplied by simple leverage, and which has a center of gravity close to the line connecting the points at which the manual force is applied so as to reduce the operator's effort to a minimum;

Another object is to provide a hedge trimmer with cutter bars which, although made of realtively thin metal, are stiff and in firm contact with each other along their entire length;

A further object is to provide a hedge trimmer in which friction is reduced to a minimum;

Still another object of my invention is to provide a multi-blade hedge trimmer that in its simplest form consists of a minimum number of parts: two similar cutter bars, two similar operating levers, and a number of minor small parts.

The manner in which these and other objects are achieved is described in the following specification and illustrated in the accompanying drawings in which:

Fig. 1 is a view of a hedge trimmer according to my invention;

Fig. 2 is a view of the cutter bar 10 of Fig. 1;

Fig. 3 is an edge view of the cutter bar 10 shown in Fig. 2;

Fig. 4 is a view, partly in section along line 4—4 of Fig. 1;

Figs. 5 and 6 are fragmentary views on an enlarged scale, partly in section, along lines 5—5 and 6—6, respectively, of Fig. 1;

Fig. 7 is a view, similar to Fig. 1, of another hedge trimmer according to my invention;

Fig. 8 is a view of the cutter bar 210 of Fig. 7; and

Fig. 9 is a fragmentary view, partly in section along line 9—9 of Fig. 7.

Referring now to the modification shown in Figs. 1 to 6, my hedge trimmer comprises two cutter bars 10 and 110 which are preferably of like shape, and one of which is shown in Figs. 2 and 3. Each of the cutter bars 10 and 110 has on one long edge thereof a plurality of knives 11 to 17 and 111 to 117, respectively. The knives are preferably formed integral with the cutter bars and each has two cutting edges as shown at 18 and 19 on knife 11 of Fig. 2. Each knife is advantageously provided with a relief cavity as shown at 120 on knife 117 in Fig. 1. Each of the cutter bars 10 and 110 is provided with a fulcrum hole 21 and 121, respectively, and with an arcuate opening 22 and 122, respectively, adjacent to said fulcrum hole. The portion of each cutter bar between its arcuate opening (22 or 122) and its long edge opposite to the edge on which the knives are disposed is offset as indicated at 23 and 123, respectively, with respective cavities 24 and 124 formed thereon. Each cutter bar has a longitudinal offset bend 25 and 125, respectively, serving to reduce the surface contact and to make the cutter bars more rigid. The cutter bars are, furthermore, provided with cavities 26 and 126, respectively, and with projections 27 and 127, respectively, having fulcrum holes 28 and 128 in bosses 29 and 129, respectively, and U-shaped grooves 30 and 130, respectively. Each of the grooves 30 and 130 is provided with two blocks, 31, 32 and 131, 132, respectively, which blocks may be formed integrally with the cutter bars or permanently attached thereto by welding or brazing.

My hedge trimmer has, furthermore, two operating levers 40 and 140 of similar shape, each provided near one end with a pivot pin 41 and 141, respectively, and with a bearing 42 and 142, respectively, centrally located in boss 43 and 143, respectively. Each lever has formed thereon an arcuate groove 44 and 144, respectively, with a dividing block 45 and 145, respectively, centrally placed in each groove, being either formed integrally with the lever or secured in place by welding or brazing. Each of the levers 40 and 140 has suitable hand grips 46 and 146, respectively, attached thereto by means of rivets as shown at 47 on lever 40.

In the assembled hedge trimmer, as shown in Figs. 1, 4, 5, and 6, the levers 40 and 140 have a portion disposed in the arcuate openings 122 and 22, respectively, said levers preferably having an offset bend 48 and 148, respectively, adjacent to said portion, the pivot pin 41 being located in the fulcrum hole 121 of cutter bar 110, and the pivot pin 141 being located in fulcrum hole 21 of cutter bar 10.

A pivot member 50 is provided with a turned-over flange 51 and passes through the fulcrum hole 28. A sleeve 52 on member 50 is disposed in the bearing 42. A nut 53 is threaded onto the member 50. Another pivot member 150 with a turned-over flange 151 passes through the fulcrum hole 128. A sleeve 152 on member 150 is disposed in the bearing 142. A second nut 153 is threaded onto the member 150. Thus the two nuts 53 and 153 fitted to their respective pivot members 50 and 150 are all that is required to hold the assembled hedge trimmer together, antifriction balls 54 being placed in the cavities 24, 124, 26 and 126, in the grooves 30, 130 and 44, 144 (wherein their travel is limited by the blocks 31, 131, 32, 132, 45 and 145) and within the turned-over flanges 51 and 151.

Each of the cutter bars 10 and 110 is advantageously curved, as shown in Fig. 3, and related to the other bar so that it presents a convex face 55 to said other bar. Such curvature, straightened out in assembly, results in a close contact between the two cutter bars along their entire length, when assembled, and particularly prevents any possible gap between the centrally located knives.

Fig. 1 shows my hedge trimmer in an intermediate position so as to better illustrate all parts and their relative positions.

In operation, the user holds the hand grips 46 and 146, moving them alternately towards each other and away from each other, while at the same time advancing along the hedge or other growth that is to be trimmed. On pushing the hand grips 46 and 146 toward each other the cutter bars 10 and 110 slide over each other until knife 11 comes opposite knife 117, knife 12 opposite knife 116 and so forth. On pulling the hand grips 46 and 146 away from each other the cutter bars slide until knife 11 comes opposite knife 116, knife 12 opposite knife 115 and so forth. By the shearing action thus taking place during each stroke a hedge can be trimmed quickly and effectively by advancing the hedge trimmer along it while at the same time moving the levers to and fro, the extent of movement of the levers being limited by the length of the arcuate openings through which they pass.

In Figs. 7 to 9 is shown a modification of my hedge trimmer which differs from the form illustrated in Figs. 1 to 6 mainly in the manner in which the operating levers are connected to the cutter bars and in which the assembly is held together.

This modification also employs two cutter bars 200 and 300 of like shape, one being shown in Fig. 8. Each cutter bar has on one long edge thereof knives 201 to 208 and 301 to 308, respectively. Each knife has two cutting edges as shown at 209 and 210 on knife 201 of Fig. 8, except that the end knives 208 and 308 need have only one cutting edge, as indicated at 211 on knife 208 in Fig. 8. Each of the cutter bars 200 and 300 is provided with a fulcrum hole 212 and 312, respectively, and with an arcuate opening 213 and 313, respectively, adjacent to said fulcrum hole. The portion of each cutter bar between its arcuate opening (213 or 313) and its long edge opposite to the edge on which the knives are disposed is offset as indicated at 214 and 314, respectively, with respective cavities 215 and 315 formed thereon. Each of the cutter bars 200 and 300 has a longitudinal offset bend 216 and 316, respectively, a cavity 217 and 317, respectively, and a projection 218 and 318, respectively. The projections 218 and 318 each have a fulcrum hole 219 and 319, respectively, a cut-out 220 and 320, respectively, and a pair of bolt holes, as shown at 221 in Fig. 8.

Operating levers 230 and 330 of this modification are again of similar shape, each being provided with two pivot pins 231, 232 and 331, 332, respectively, with a pair of bent-up tabs as indicated at 333 and 334 on lever 330, and with hand grips as indicated at 235 on lever 230.

In the assembled hedge trimmer, as shown in Figs. 7 and 9, the levers 230 and 330 have a portion disposed in the arcuate openings 313 and 213, respectively, with the pivot pin 231 in fulcrum hole 312, pivot pin 331 in fulcrum hole 212, pivot pin 232 in fulcrum hole 219, and pivot pin 332 in fulcrum hole 319, washers 236 and 336 being placed over pivot pins 232 and 332, respectively. A pair of plates 240 and 340 are mounted on projections 218 and 318, respectively, in spaced relationship by means of bolts 241 and nuts 242, the spacing being provided by tubular spacers placed over the bolts 241, as indicated at 243 in Fig. 9. The plates 240 and 340 have cavities 244 and 344, respectively, with a central block provided in each of said cavities, as indicated at 345 on cavity 344. Anti-friction balls 246 are disposed in the cavities 215, 315, 217, 317, 244 and 344. The tabs on the operating levers (such as 333 and 334) extend into the plate cavities (such as 344) to retain the balls 246 disposed therein and limit their travel.

The cutter bars 200 and 300 are preferably curved, as shown in Fig. 3, so that they present convex faces to each other, to insure good contact between them over their entire length, as more fully described in connection with Figs. 1 to 6.

In operation, the levers 230 and 330 are alternately moved toward and away from each other, the device functioning in essentially the same manner as that shown in Figs. 1 to 6.

The cutter bars and operating levers, as well as the plates of the modification shown in Fig. 7, may conveniently be made from flat sheet stock. This makes for low weight and low manufacturing costs. The cutter bars must, of course, be hardened to provide cutting edges which will remain sharp for a satisfactorily long period of time. If the knives become dull after prolonged use, they can readily be sharpened without need for taking the hedge trimmer apart.

While I have shown and described what I consider the preferred embodiments of my invention, modifications may be made without departing from its spirit, and reference is, therefore, made to the appended claims for a definition of the scope of this invention.

What I claim is:

1. A hedge trimmer comprising two similar juxtaposed oblong cutter bars in sliding engagement with each other, each cutter bar being provided with a plurality of cutting knives on one long edge thereof, with a fulcrum near one short edge thereof, with an arcuate opening adjacent to said fulcrum, the portion of each cutter bar between its other long edge and said arcuate opening being offset, each cutter bar being further provided with a projection near the other short edge thereof and with another fulcrum in said projection, and two similar operating levers each having pivot means near one end operatively connected with the first named fulcrum of one of said cutter bars, each of said levers also having other pivot means and a portion between its said first named pivot means and its said other pivot means disposed in said arcuate opening in said one cutter bar, said other pivot means being operatively connected with said other fulcrum of the other of said cutter bars, each of said levers also having a portion disposed between one of said cutter bars and the said offset portion of the other of said cutter bars.

2. In the combination of claim 1, a pair of plates each fastened to one of said projections in spaced relationship, each of said operating levers having a piece extending through the space between one of said plates and one of said projections, said piece being located between said two pivot means of each operating lever.

References Cited in the file of this patent

UNITED STATES PATENTS

| | | |
|---|---|---|
| 173,564 | Shaw | Feb. 15, 1876 |
| 357,718 | Lee | Feb. 15, 1887 |
| 736,854 | Long | Aug. 18, 1903 |
| 1,494,336 | Bowman | May 20, 1924 |
| 1,789,370 | Nylander | Jan. 20, 1931 |
| 2,566,492 | Howell | Sept. 4, 1951 |
| 2,714,762 | Green | Aug. 9, 1955 |